United States Patent [19]

Nishio

[11] Patent Number: 5,059,267

[45] Date of Patent: Oct. 22, 1991

[54] METHOD FOR MANUFACTURING A POROUS BODY OF MOLYBDENUM SILICIDE

[75] Inventor: Hiroshi Nishio, Kawasaki, Japan

[73] Assignee: NKK Corporation, Tokyo, Japan

[21] Appl. No.: 574,478

[22] Filed: Aug. 29, 1990

[30] Foreign Application Priority Data

Sep. 12, 1989 [JP] Japan .................................. 1-234727

[51] Int. Cl.$^5$ ............................................. C23C 22/00
[52] U.S. Cl. ...................................... 156/89; 264/85; 264/101; 264/263
[58] Field of Search ...................... 156/296, 89; 419/2, 419/45, 61, 65; 501/96; 423/53; 264/101, 263, 85

[56] References Cited

U.S. PATENT DOCUMENTS 4,840,778 6/1989 Arai et al. ............................ 423/324
4,938,798 7/1990 Chiba et al. ............................ 75/230

*Primary Examiner*—James Lowe
*Assistant Examiner*—Christopher A. Fiorilla
*Attorney, Agent, or Firm*—Frishauf, Holtz, Goodman & Woodward

[57] ABSTRACT

A method for manufacturing a porous body of molybdenum silicide includes the steps of making a bundle of molybdenum pipes by bundling at least seven molybdenum pipes, impregnating inorganic polysilazane into voids formed between portions where molybdenum pipes contact each other, heating the bundle of molybdenum pipes in a non-oxidizing atmosphere at a temperature of 1000° to 1900° C. The bundle has 100 to 1000000 molybdenum pipes. The inorganic polysilazane is made from $H_2SiCl_2$.

21 Claims, No Drawings

METHOD FOR MANUFACTURING A POROUS BODY OF MOLYBDENUM SILICIDE

BACKGROUND OF THE INVENTION

1. Field of the Invention

The present invention relates to a method for manufacturing a porous body fit for use at a high temperature.

2. Description of the Related Art

Great hopes are set on a ceramic porous body which is used as a plane combustion porous board, a heat transfer sensing element and a dust removing filter. The plane combustion porous board is used at a high temperature of 1000° C. or more. The heat transfer sensing element converts heat obtained by convective heat transfer to radiative heat. The dust removing filter is used for high-temperature dust containing gas. An alumina porous body is often applied for the aforementioned use. A Japanese Patent Publication Laid Open No. 167290/89 discloses that silicon carbide or silicon nitride is formed on the surfaces of a preform of carbon fibers. It has been difficult to apply the prior art ceramic porous body to the use wherein the ceramic body is repeatedly heated and cooled in an oxidizing atmosphere at temperatures between a temperature of more than 1000° C. and normal temperature. That is, since the thermal expansion coefficient of the alumina porous body is large and the heat conductivity of the alumina porous body is small, the alumina porous body is liable to crack at the steps of heating and cooling. In consequence, the alumina porous body is not fit for use for a long period of time. In the case of carbon material coated with silicon carbide or silicon nitride, the thermal expansion coefficient of the coating layer is larger than that of the base material, the coating layer is split off at the step of repeated heating and cooling, and carbon in the base material can be exposed and combusted.

SUMMARY OF THE INVENTION

It is an object of the present invention to manufacture a porous body which is not substantially worn by oxidation even in the air of high temperature and can endure a thermal shock.

To attain the aforementioned object, the present invention provides a method for manufacturing a porous body of molybdenum silicide, comprising the steps of:

making a bundle of molybdenum pipes by bundling at least seven molybdenum pipes;

impregnating inorganic polysilazane into voids formed in portions where molybdenum pipes contact each other; and heating the bundle of molybdenum pipes in a non-oxidizing atmosphere at a temperature of 1000° to 1900° C.

The above objects and other objects and advantages of the present invention will become apparent from the detailed description which follows, taken in conjunction with the appended drawings.

DESCRIPTION OF THE PREFERRED EMBODIMENT

At least seven molybdenum pipes or more are bundled. Inorganic polysilazane is impregnated into the voids formed in the portion where the bundle of the molybdenum pipes contact each other. The bundle of the molybdenum pipes impregnated by inorganic polysilazane is heated in the non-oxidizing atmosphere at a temperature of 1000° to 1900° C. At least the surfaces of the molybdenum pipes are converted to molybdenum disilicide.

The molybdenum pipes can be made from either pure molybdenum or molybdenum alloy. In the case of the molybdenum alloy pipes, at most 10 wt. % of at least one selected from the group consisting of titanium, zirconium, niobium, tantalum, hafnium, silicon and carbon is added to molybdenum.

The external diameter and the wall thickness of the molybdenum pipe are selected in accord with the purpose of use of the molybdenum pipe. A bundle of the molybdenum pipes can be made by combining two sorts or more of molybdenum pipes with various outer diameters and wall thicknesses. The number of the molybdenum pipes is various dependent on the purpose of use of the molybdenum pipes. However, the number of 100 to 1000000 pipes is preferred.

The molybdenum pipe of 0.2 to 2.0 mm in inside diameter is preferred. When the inside diameter of the molybdenum pipe is less than 0.2 mm, a pressure loss increases. When the inside diameter of the molybedenum pipe exceeds 2.0 mm, a channeling inside the molybdenum pipe is liable to occur. The wall thickness of the molybdenum pipe is about 20 to 500 $\mu$m.

Three sorts of methods of bundling the molybdenum pipes are pointed out. A first method is a method of adhering the molybdenum pipes to each other by means of adhesive agent. A second method is a method of bundling the molybdenum pipes with molybdenum wires. A third method is a method of causing a bundle of the molybdenum pipes to undergo a diffused junction by sintering the bundle of the molybdenum pipes.

Inorganic polysilazane is an elastomer obtained by diluting chlorosilane $H_{4-a}SiCl_a$ (a=1,2,3,4) in a solvent and reacting it with ammonia. Relative to the method of the present invention, the inorganic polysilazane can be produced by using $H_2SiCl_2$ as material or by using a mixture of different chlorosilane with $H_2SiCl_2$ as a main component. The inorganic polysilazane is liquid at room temperature. Benzene, diethylether, dichloromethane, tetrahydrofuran, pyridine or the like is used as solvent. The structures, compositions and molecular weight of inorganic polysilazane synthesized vary somewhat depending on the sorts of the solvents. However, although any of them is used, inorganic polysilazane consists of hydrogen, nitrogen and silicon, and does not contain carbon. Inorganic polysilazane having structures such as $[H_2SiNH]_x$, $[H_2SiNH]_x \cdot [(H_2Si)_{1.5}N]_y$ is used as the inorganic polysilazane. Such inorganic polysilazane can be used as it is as a coating liquid. The inorganic polysilazane can be used as the coating liquid by diluting the inorganic polysilazane with a solvent. Benzene, diethylether, dichloromethane, tetrahydrofuran, pyridine or the like can be used as the solvent for dilution. The ratio of the dilution is determined by a necessary amount of inorganic polysilazane in the liquid having been impregnated into the porous body relative to the amount of molybdenum constituting the porous body. The ratio of the amount of the solvent to the amount of polysilazane is desired to be determined at about 80 wt. % or less by experience.

Three methods of impregnation are provided. A first method is provided wherein inorganic polysilazane as impregnant is impregnated under elevated pressure into voids formed in portions where the molybdenum pipes contact each other. A second method is provided wherein inorganic polysilazane can be sucked into the voids formed in the portions, where the molybdenum pipes contact each other, by making the voids vacuous. A third method is provided wherein inorganic polysilazane can be impregnated under elevated pressure into the voids formed in the portions, where the molybdenum pipes contact each other, by making the voids vacuous. In the method for impregnation under elevated pressure, the impregnant can be sufficiently impregnated under elevated pressure into the voids formed in the portions, where the molybdenum pipes contact each other, by keeping the molybdenum pipes as they are under elevated pressure for a predetermined period of time after the impregnation of the impregnant into the voids. The pressure for the impregnation under elevated pressure is desired to be 5 to 5000 kg/cm². When the pressure is below 5 kg/cm², the impregnant is not sufficiently impregnated into the voids formed in the portions where the molybdenum pipes contact each other. When the pressure is 5000 kg/cm², the impregnat is sufficiently impregnated into the voids. When the pressure exceeds 5000 kg/cm², a higher effect cannot be expected.

The bundle of the molybdenum pipes impregnated by the inorganic polysilazane is heated in the non-oxidizing atmosphere. An inert atmosphere such as inert gases of argon and helium, a reducing atmosphere such as hydrogen or an atmosphere of nitrogen gas is used as the non-oxidizing atmosphere. However, since molybdenum disilicide is not formed when a pressure of nitrogen gas is elevated, the atmosphere of nitrogen gas is not appropriate.

When the bundle of the molybdenum pipes is heated in the non-oxidizing atmosphere, initially, solvent is evaporated. The inorganic polysilazane begins to be pyrolyzed at a temperature of about 150° C., and the pyrolysis of the inorganic polysilazane substantially terminates at a temperature of 600° C. Amorphous silicon nitride is obtained by the pyrolysis. Further, when the amorphous silicon nitride is heated in the inert atmosphere, the silicon nitride reacts with molybdenum at a temperature of about 950° C., molybdenum silicide ($MoSi_2$, $MoSi_3$) is generated. Nitrogen is released during the reaction. The temperature applied to the reaction is desired to be from 1000° to 1900° C. When the temperature exceeds 1900° C., a phenomenon such that a very small amount of oxygen inevitably mixed in the atmospheric gas is connected to silicon and SiO gas is released cannot be ignored. The preferred heating temperature is in the range of from 1100° to 1600° C.

The amorphous silicon nitride can be heated until the surfaces of the pipes convert to molybdenum disilicide. A period of time, during which the amorphous silicon nitride is heated, varies depending upon the temperature of heating and the like. The period of time of heating is usually about one hour, for example, at a temperature of 1150° C. The period of time of heating of 1 to 10 hours is preferred.

Molybdenum disilicide protects the surfaces of the molybdenum pipes and causes the molybdenum pipes to adhere to each other or increases the adhesive strength.

EXAMPLE

A bundle of seamless molybdenum pipes in the form of a square pillar of 100 mm in length, 86 mm in height and 100 mm in breadth was made by arranging 10000 of seamless molybdenum pipes of 1 mm in outer diameter, 100 μm in wall thickness and 100 mm in length in one direction. The pipes were fixed in six positions at intervals of 20 mm. The bundle of the seamless molybdenum pipes was put into a sintering furnace, heated at 1400° C. and kept in an atmosphere of hydrogen for 6 hours, and, thereafter, naturally cooled. In this way, the bundle of pipes was caused to undergo a diffused junction in the portions where the pipes contact each other. Subsequently, the bundle of the pipes was divided into ten portions, and the molybdenum wires were removed.

The divided bundle of the pipes was degassed under a vacuum in a vessel of silicone rubber. After the pressure inside the vessel had been decreased to $10^{-2}$ Torr, liquid inorganic polysilazane was introduced into the vessel. The liquid inorganic polysilazane was impregnated into voids formed in portions where the molybdenum pipes contact each other. Then, the rubber vessel was sealed with a lid of silicone rubber. A pressure of 5000 kg/cm² was applied onto the rubber vessel from outside the rubber vessel by means of a cold isostatic press. The bundle of the pipes was taken out of the rubber vessel. The bundle of the pipes already treated was put into a heating furnace and heated up to 600° C. at a rate of 10° C./min. After the bundle of the pipes had been kept as it was for an hour, the bundle of the pipes was naturally cooled. The bundle of the pipes after the natural cooling was put into the heating furnace and heated up to 1500° C. at a rate of 30° C./min in an atmosphere of argon under atmospheric pressure. After the bundle of the pipes was kept as it was for five hours, the bundle of the pipes was naturally cooled.

The porous body obtained was kept as it was in an atmosphere of air at a temperature of 1200° C. for 100 hours. It was found that the weight of the porous body was decreased by only 0.08 wt. %. As a result of having examined the section of the pipes by means of transmission X-ray, the generation of $MoSi_2$ at 9 μm from the surface of the pipe and $MoSi_3$ at 6 μm from $MoSi_2$ toward the inner side of the pipe was confirmed.

On the other hand, it was ten times repeated that the porous body produced in such a manner as described above was heated upto 1200° C. at a rate of 35° C./min and put into water, but there was no change in the porous body.

As described above, according to the present invention, the porous body can be substantially perfectly prevented from being worn by oxidation even in the air of more than 1000° C. The porous body can also endure a heat shock.

What is claimed is:

1. A method for manufacturing a porous body of molybdenum silicide, comprising the steps of:
    making a bundle of molybdenum pipes by bundling at least seven molybdenum pipes;
    impregnating inorganic polysilazane into voids formed between portions where molybdenum pipes contact each other; and
    heating the bundle of molybdenum pipes in a non-oxidizing atmosphere at a temperature of 1000° to 1900° C. such that at least the surfaces of the molybdenum pipes are converted to molybdenum silicide.

2. The method of claim 1, wherein said molybdenum pipe is made from pure molybdenum.

3. The method of claim 1, wherein said molybdenum pipe is made from molybdenum alloy made by adding at most 10 wt. % of at least one selected from the group consisting of titanium, zirconium, niobium, tantalum, hafnium, silicon and carbon to molybdenum.

4. The method of claim 1, wherein said molybdenum pipe has an inside diameter of 0.2 to 2.0 mm and a wall thickness of 20 to 500 μm.

5. The method of claim 1, wherein said bundle has 100 to 1000000 molybdenum pipes which are bundled.

6. The method of claim 1, wherein said step of making a bundle of the molybdenum pipes comprises adhering the molybdenum pipes to each other by means of adhesive agent.

7. The method of claim 1, wherein said step of making a bundle of the molybdenum pipes comprises bundling the molybdenum pipes by means of molybdenum wires.

8. The method of claim 1, wherein said step of making a bundle of the molybdenum pipes comprises connecting the molybdenum pipes to each other by sintering the molybdenum pipes.

9. The method of claim 1, wherein said inorganic polysilazane is made from $H_2SiCl_2$.

10. The method of claim 1, wherein said inorganic polysilazane is made from a mixture of at least two sorts of chlorosilane.

11. The method of claim 1, wherein said step of impregnating includes impregnating under elevated pressure inorganic polysilazane into voids formed between portions where the molybdenum pipes contact each other.

12. The method of claim 11, wherein said inorganic polysilazane is impregnated at a pressure of 5 to 5000 kg/cm$^2$.

13. The method of claim 1, which further comprises the steps of:
putting the bundle of the molybdenum pipes into a flexible vessel; and
reducing a pressure inside the flexible vessel.

14. The method of claim 1, wherein said non-oxidizing atmosphere is an inert atmosphere.

15. The method of claim 1, wherein said non-oxidizing atmosphere is an atmosphere of reducing gas.

16. The method of claim 1, wherein
said bundle has 100 to 1000000 molybdenum pipes which are bundled;
said step of bundling comprises bundling the molybdenum pipes by means of molybdenum wires; and
said step of impregnating comprises impregnating impregnant under elevated pressure into voids formed between portions where the molybdenum pipes contact each other.

17. The method of claim 1, wherein said molybdenum pipes have an inside diameter of 0.2 to 2.0 mm and a wall thickness of 20 to 500 μm and wherein said step of making a bundle of the molybdenum pipes comprises bundling the molybdenum pipes by means of molybdenum wires.

18. The method of claim 16, wherein said molybdenum pipes have an inside diameter of 0.2 to 2.0 mm and a wall thickness of 20 to 500 μm and wherein said step of making a bundle of the molybdenum pipes comprises bundling the molybdenum pipes by means of molybdenum wires.

19. The process of claim 1, wherein said heating in a non-oxidizing atmosphere is at a temperature of 1100° to 1600° C.

20. The process of claim 17, wherein said heating in a non-oxidizing atmosphere is at a temperature of 1100° to 1600° C.

21. The process of claim 18, wherein said heating in a non-oxidizing atmosphere is at a temperature of 1100° to 1600° C.

* * * * *

UNITED STATES PATENT AND TRADEMARK OFFICE
CERTIFICATE OF CORRECTION

PATENT NO. : 5,059,267
DATED : October 22, 1991
INVENTOR(S) : Hiroshi Nishio

It is certified that error appears in the above-indentified patent and that said Letters Patent is hereby corrected as shown below:

Title page, item [75], Inventor, replace "Hiroshi" with --Hiroaki--.

Signed and Sealed this

Twentieth Day of September, 1994

Attest:

BRUCE LEHMAN

*Attesting Officer*  *Commissioner of Patents and Trademarks*